FIG. I

INVENTORS.
HUGO R. SANTORA
GEORGE P. LUNDAY
JAMES A. BENSON
BY
William R. Lane
ATTORNEY Feb. 16, 1960  H. R. SANTORA ET AL  2,925,013
ROCKET ENGINE ASSEMBLY TESTING AND
LAUNCHING APPARATUS
Filed May 1, 1956  6 Sheets-Sheet 3

*INVENTORS.*
HUGO R. SANTORA
GEORGE P. LUNDAY
BY  JAMES A. BENSON

*William L. Lane*
ATTORNEY

INVENTORS.
HUGO R. SANTORA
GEORGE P. LUNDAY
JAMES A. BENSON
BY

*William L. Lane*
ATTORNEY

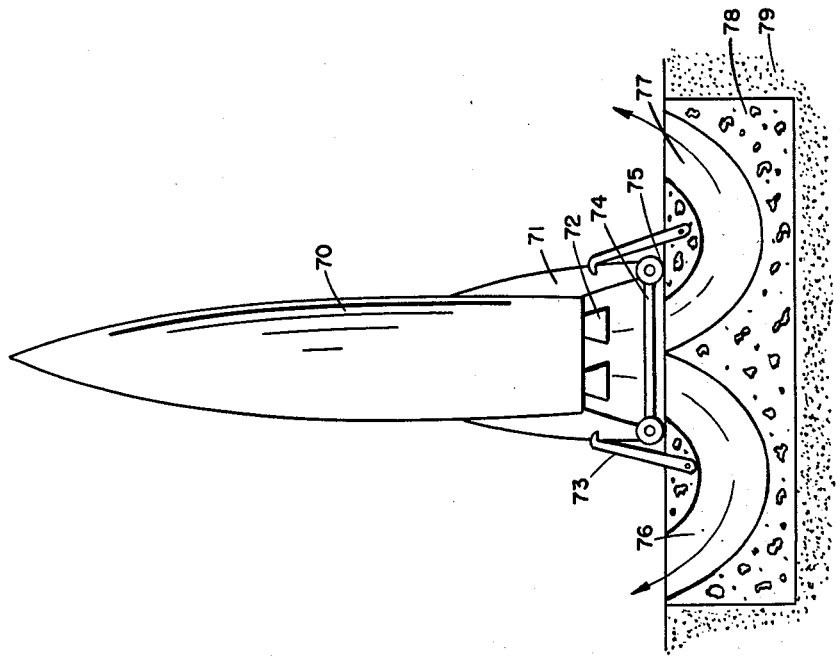
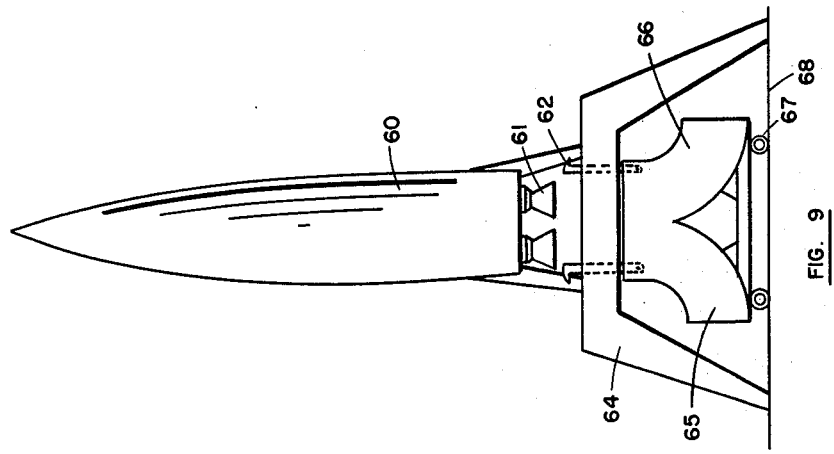
INVENTORS.
HUGO R. SANTORA
GEORGE P. LUNDAY
JAMES A. BENSON
BY
William R Lane
ATTORNEY United States Patent Office 2,925,013
Patented Feb. 16, 1960

2,925,013

ROCKET ENGINE ASSEMBLY TESTING AND LAUNCHING APPARATUS

Hugo R. Santora, Los Angeles, George P. Lunday, Whittier, and James A. Benson, Van Nuys, Calif., assignors to North American Aviation, Inc.

Application May 1, 1956, Serial No. 582,035

4 Claims. (Cl. 89—1.7)

The present invention is directed to a rocket engine assembly testing device. More particularly this invention is directed to a new and novel flame deflector assembly in combination with a rocket engine test stand or a rocket-powered missile launching apparatus.

Static firing of rocket engines is necessary for their proper development and manufacture. Large rocket engines are normally fired on a test stand in a vertical position to simulate the launching position of the engines when used in rocket-powered missiles. In providing a test stand facility for such engines, it is ordinarily necessary that such stands support the engine, the propellent tanks, and extensive plumbing and wiring. It must also absorb the full thrust of the engine in operation. In the launching of rocket-powered missiles, it is desired that the facility be used either for static firings or actual launchings. Furthermore, it is desirous that the facility be such that the missile be brought into the firing position in the shortest possible time before actual launching.

Heretofore, in the testing of large rocket engines the engines have been elevated on a high structure in order to allow space for dissipation of the flame. Such supporting structure or test stand must be a major size structure since it absorbs the full thrust of the engine. Test stands heretofore, which were constructed prior to those of this invention, were massive structures of steel and reinforced concrete built at tremendous expense. A further drawback of such stands is the fact that the working area is at a high level creating many problems in worker safety and efficient operation and repair. Attempts were made during and following World War II to deflect the rocket blast in a horizontal direction in an attempt to cut the height of the test stand. Concrete deflectors were proposed and used for this purpose. Experience has shown that these deflectors have eroded at a rate of as much as 1½ inches per minute at thrust levels well under that of the engines being tested today. Suggestions were also made of providing metal deflectors but it was soon evident that any available and practical metal deflector would commence melting after a few seconds of operation due to the great heat and impingement force of the rocket exhaust. In some relatively low thrust engines as much as 1/16" of the metal surface has been removed in under 5 seconds. Attempts were then made to provide for cooling of the flame deflector. Before the present invention was conceived such cooling took the form of spraying water directly into the core of the rocket engine exhaust stream in order to cool such stream to an extent that it would not heat the deflector. It was found that such water tended to open up the jet stream to some degree but that the cooling effect on the deflector was negligible. Further suggestions and work was done by spraying cooling water directly on to the deflector surface, however, such idea met with little success due to the great impingement force of the rocket blast on the deflector surface. In Germany, a deflector lined with water tubes through which cooling water was circulated was tested but proved costly in that the tubes would warp and eventually burst. Attempts to protect the concrete surfaces of deflectors with tank treads and boiler plate were equally unsuccessful.

The present invention entails an entirely new concept in the dissipation of a rocket engine exhaust stream by providing a particular type of film cooling of a generally curved metal flame deflector and in greatly simplifying test stand superstructure both in height, cost, ease of operation, and efficiency by structurally tying the flame deflector to the rocket engine assembly so that the force exerted on the deflector is reacted against the thrust of the engine itself in an approximate straight-line stress path between the deflector and engine assembly. As an example of the unusual and highly successful use of this device, over 250 runs each from a few milliseconds to over one minute in duration, have been made on one particular installation of the test stand combination of this invention. Basically, the film cooling of the deflector has been accomplished by providing an open-ended tubular flame deflector having a series of variably spaced water manifolds on the exterior periphery of the deflector, a series of variably spaced apertures of varying size leading from the manifolds to the inner surface of the deflector and means supplying water at various pressures to the manifolds and apertures such that the water is injected into the deflector primarily at the points of impingement of the rocket exhaust stream. The tying of the deflector to the engine assembly is accomplished by tension members directly connecting the engine assembly mounting to the deflector itself. Modifications of this basically described apparatus directed to particular test stand installations and to launching facilities are hereinafter described.

An object of this invention is to provide a new and novel rocket engine testing device.

A further object of this invention is to provide a flame deflector adapted to deflect a high temperature, rocket engine exhaust stream.

A still further object of this invention is to provide a combination of a flame deflector and rocket engine test stand resulting in a compact overall installation.

An additional object of this invention is to provide a simplified rocket engine test stand.

Another object of this invention is to provide a new and novel rocket-powered missile launching and static firing device.

A further object of this invention is to provide mobile launching apparatus for rocket-powered missiles.

A still further object of this invention is to provide a combination deflector and test stand or launching device in which all dynamic forces and stresses against the deflector are cancelled out.

The above objects as well as other objects of this invention will be apparent from the following description and the accompanying drawings in which:

Fig. 9 is a portable static firing and launching installation for a rocket-powered missile;

Fig. 10 is a ground level launching and static firing facility;

Figure 11:
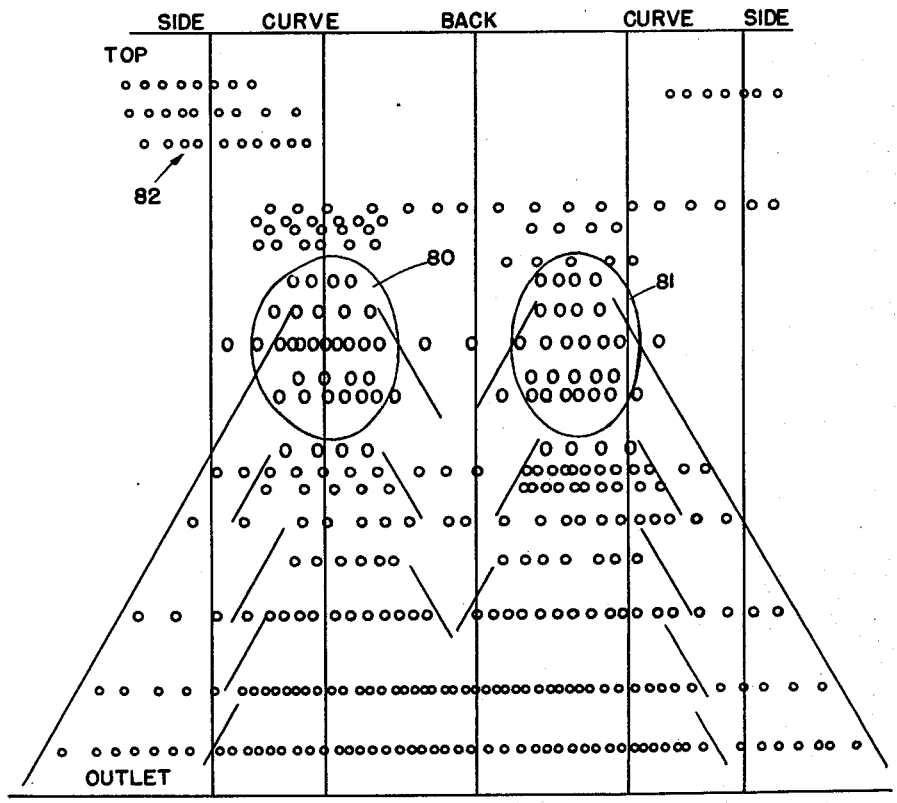

And Fig. 11 is a developed view of a typical flame deflector aperture diagram.

Figure 1:
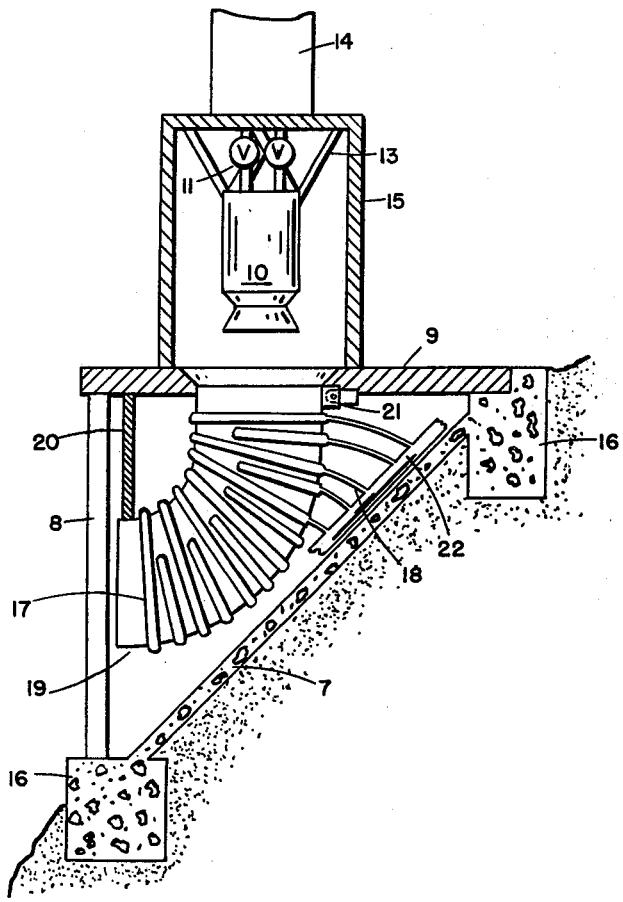
Fig. 1 represents a partial side view of the combined deflector and test stand with the stand support members in cross-section.

Fig. 1 shows a rocket engine testing device incorporating the basic features of the present invention. A rocket engine 10 is mounted by an assembly including mounting struts 13 to a structural member 15 hereinafter called the rigid bent. The rigid bent 15 supports a propellent tank or tanks 14 and hardware such as pipes 11 and valves V for conducting propellant to the combustion chamber of the rocket engine. The rigid bent 15 is structurally attached to a working platform 9 under which the flame deflector 19 is hung. The working platform 9 is supported by structural members typically including upright structural portion 8 laterally spaced from the open mouth of the deflector 19. This portion 8 may be sunk into caissons 16 firmly embedded into the ground. Structural members other than this shown are added for various purposes as directed by the particular stresses in the over-all structure. The flame deflector 19 is hung on platform 9 by a pair of pin connected feet 21 and by a flexure plate 20 extending vertically from the top front lip of the deflector to the main beam structure 9 of the test stand. The supports are designed to allow maximum freedom for thermal expansion. Around the exterior periphery of the 90° tubular elbow shown are a series of manifolds 17 extending for various peripheral distances around the deflector. These manifolds are adapted for conveying water from inlet pipes 18 to apertures on the inside surface of the deflector opposite the manifolds themselves. A main header 22 supplies water under pressure to the inlet pipes 18. The rigid connection between the flame deflector and the rocket engine assembly are situated so that the stresses exerted against the inner surface of the flame deflector by the rocket engine exhaust stream are reacted back in the rocket engine mounting assembly in an approximately straight line. A structural member or concrete pad member 7 roughly conforming to the slope of the test stand site may be provided to facilitate drainage in the event of water or propellent overflow. The pin connected joint 21 acts further to absorb the lateral component of the thrust against the flame deflector impingement zone. The rocket engine 10 is mounted above the deflector such that the angle of impingement of the rocket exhaust stream with respect to the deflector surface is preferably less than 45°.

Figure 2:
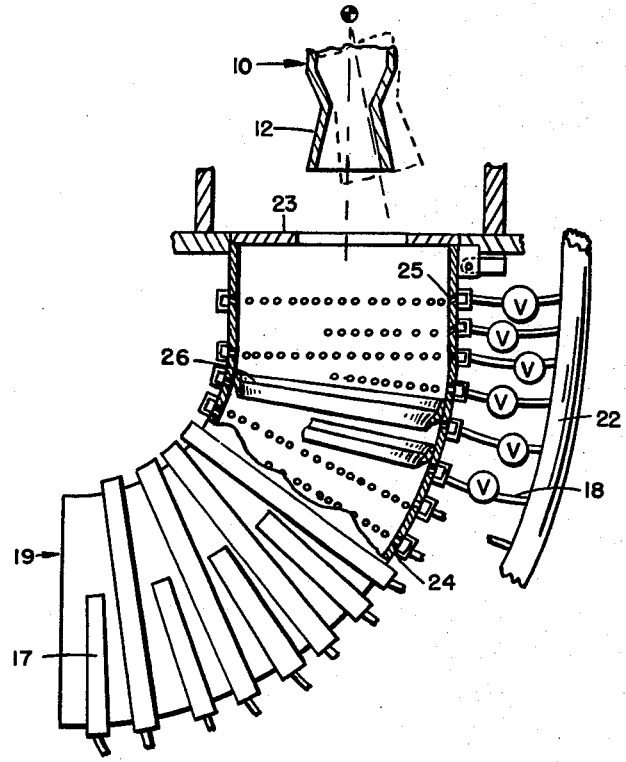
Fig. 2 is a detailed cross-section view of the deflector per se.

Fig. 2 shows a cross-sectional view of the deflector in detail. The manifold 17 extends internally or partially around the exterior periphery of the deflector in variously spaced orientations. Water inlet conduits 18 leading from header 22 are attached to manifolds 17 which in turn cover a series of variously spaced, variously sized, and variously oriented apertures 24 through the shell of the flame deflector 19. When necessary, various modifications can be made to more closely direct the water stream from the manifold 17 to provide film cooling of the interior surfaces of the deflector. Thus, the apertures 24 may be drilled at a downward or lateral angle as at 25 so as to direct a flow in a direction more parallel to the downward curvature of the deflector surface. A further modification of this basic idea is seen in Fig. 2 wherein elongated or single cap members 26 are welded or otherwise attached above a row of apertures 24 and extend in front of the opening of the aperture so as to deflect water emitted therefrom in a downward or otherwise desired direction. These caps have been used with success to deflect the water downstream in order to provide a less obscure observation of various stages in the ignition and operation of the rocket engine exhaust.

The flame deflector 19 preferably includes cover members 23 which partially cover the top of the deflector to prevent blow-back of spray vapor and flame around the nozzles and work platform. This cover portion gave optimum results when it was most complete, a sufficient opening being left to pass the flame from the rocket engine nozzle 12. The rocket engine may be gimballed as indicated by the dashed lines in Fig. 2 in which event cover members 23 must be modified to pass the exhaust stream. The particular angle of impingement of the jet exhaust on the deflector plate is a critical element in the proper design of a flame deflector assembly. It governs the minimum gas pressure against the deflector which in turn determines the minimum manifold water pressure. Furthermore, this angle controls the tendency of the exhaust stream to reverse or blow-back and controls the extent of fanning out or divergence of the flow pattern. The flame impinging against the deflector has been observed closely. The normal pale blue transparent flame of the engine itself takes on a reddish yellow color after impingement and the film coolant streaks glow with a pinkish-white light from the minerals in the water. The flame jets strike the bottom of the deflector where they fan out and merge to form a sheet. This sheet is turned up at the corners and extends over the sides and most of the top of the deflector by the time it reaches the exit end.

Figure 3:
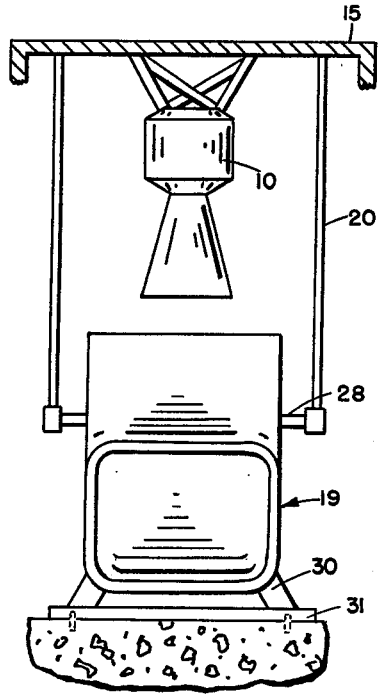
Fig. 3 is a partial front view of a rocket engine assembly and deflector combination.
Figure 4:
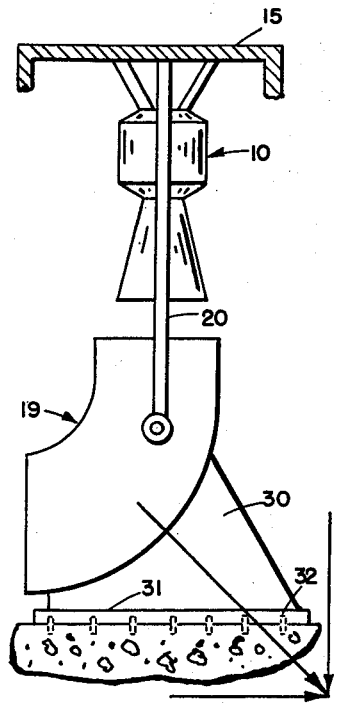
Fig. 4 is a side view of the installation of Fig. 3.

Fig. 3 is a partial schematic view of a simplified form of flame deflector. This deflector and those illustrated in the remaining figures may or may not have water manifolds on the exterior thereof depending on whether or not the installation is only for launching, short time static firing or long term static firing. The flame deflector 19 is mounted on a base member 31 by supports 30 and the entire assembly partially raised on the ground. The rocket engine 10 is held and supported by a rigid bent 15 and other structural members (not shown) and is tied directly to the flame deflector 19 by means of tension members 20 attached by pin means 28. This simplified device is seen in side view in Fig. 4 and includes shear connections 32 for absorbing the lateral components of the rocket engine exhaust thrust against the flame deflector as well as tension members 20 for cancelling out the vertical thrust moments.

Figure 5:
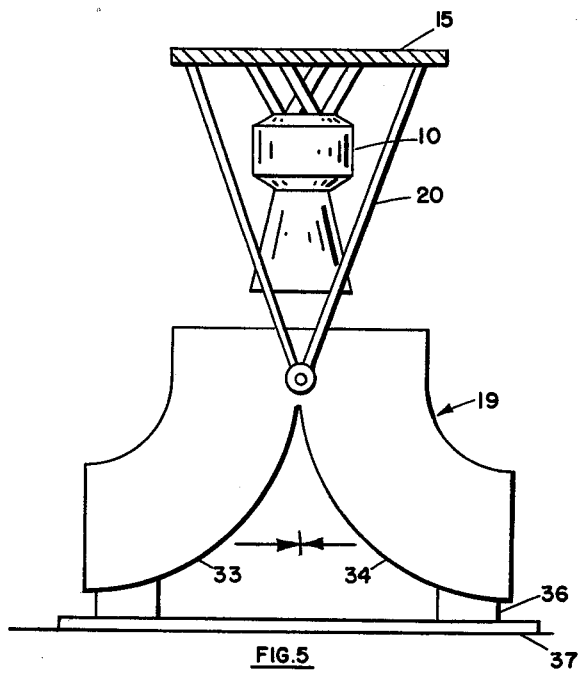
Fig. 5 is a side view of a modified deflector etc.

Fig. 5 shows an apparatus not only for reacting the downward thrust upon the deflector back directly into the engine assembly but for cancelling out the lateral thrust components. This deflector includes first and second flame deflector surfaces 33 and 34 for eliminating horizontal loads on the flame deflector by sending the several components in compensating directions. This flame deflector may rest freely on the ground and be supported by base member 37 and structural members 36.

Figure 6:
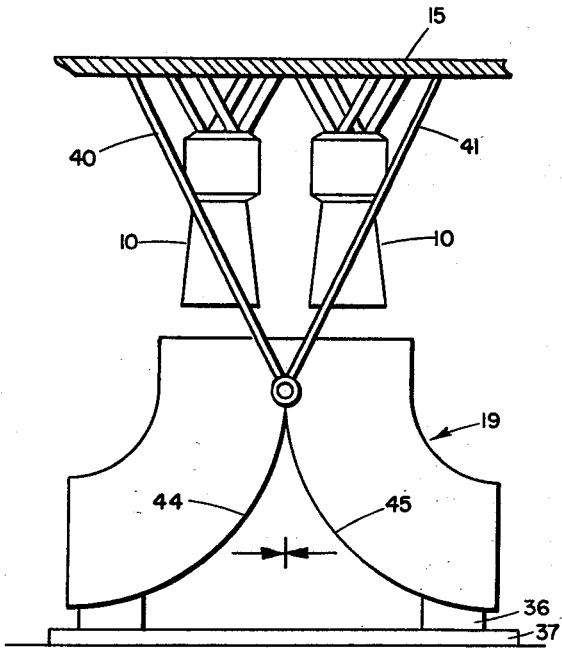
Fig. 6 is a modified deflector and test stand installation for multiple rocket engines.

Fig. 6 is an adaptation of the device seen in Fig. 5 including means 15 to mount a pair of rocket engines 10, one or both of which may be gimballed, and a deflector adapted to deflect the exhaust stream from each in compensating directions. Deflector surfaces 44 and 45 are provided to accomplish this result. The deflector is tied into the rocket engine assembly structure by tension members 40 and 41.

Figure 7:
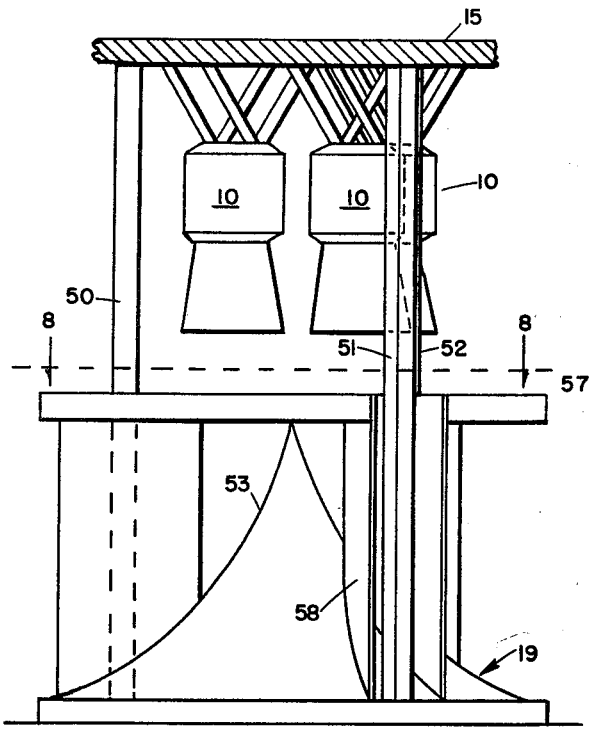
Fig. 7 is another deflector and stand modification for rocket engines arranged in a pod.

Fig. 7 represents a still further modification of the flame deflector combination of this invention in which a pod arrangement of three rocket motors is positioned on a rigid bent 15 directly above the flame deflector 19. The flame deflector has a conical deflector surface which deflects the flame from each engine at angles of 120° from each other so as to cancel out all horizontal components of thrust.

Figure 8:
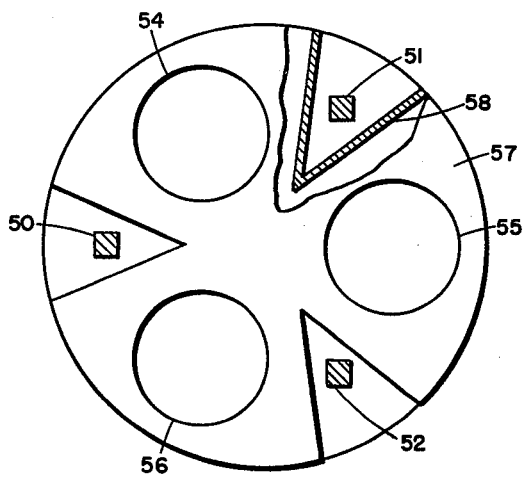
Fig. 8 is a cross-sectional view taken in the horizontal plane 8—8 of Fig. 7.

As seen in Fig. 8 apertures 54, 55 and 56 are provided in a top plate 57 of the deflector assembly to prevent blow-back as heretofore described. Top plate 57 may also serve as the work platform when repairs or adjustments are being made on the engine. Tension members 50, 51, 52 are provided to react the thrust against the deflectors in a straight line back to the rocket engine assembly. Protective shields 58 are provided around each of the tension members to protect them from the blast products.

Fig. 9 shows a flame deflector similar to that shown in Fig. 5 which is used in conjunction with a mobile launching platform 64. The flame deflector has flame deflector portions 65 and 66 adapted to deflect one or more exhaust streams in compensating directions. The launching pedestal 64 or the flame deflector alone is adapted to roll on to the launching site by means of wheels 67 attached to the deflector which may roll on a track 68. Other equivalent means of transportation may also be employed. Attaching arms 62 are provided to lock the flame deflector on the missile frame structure of the missile 60. The rocket engines 61 of the missile are positioned over the flame deflector and are adapted for static test firing in the position shown. If launching of the missile is desired, the arms 62 may be detached either manually or automatically, typically by hydraulic actuators, before or during the firing procedure.

A still further modification of a launching facility incorporating a principle of this invention is seen in Fig. 10. A missile 70 is shown in position for static firing or launching. Superstructure 71 of the missile extends below the rocket engine 72 and is attached by shear pins or the like to an open frame launching cart 74 which may be rolled into position on wheels 75 or positioned by other means over flame deflector tunnels 76 and 77 below ground level. Preferably the tunnels are formed in a solid block of concrete 78 in the ground 79. The tunnels may be metal lined, if desired. Hold down hooks 73 which are pivotally attached to block 78 and latched into superstructure 71 react the forces directly from the deflector to the rocket engine assembly as in the above described test stand and deflector combinations. The facility shown in Fig. 10 may be used for production testing of rocket engine assemblies. A rocket engine or group of engines are placed on a wheeled dolly along with propellent tanks and other hardware, then they are rolled into place over the deflector and tied to the deflector assembly by the above-mentioned hooks.

Fig. 11 shows a typical development view of the internal surfaces of a typical flame deflector of this invention. It is to be noted that the apertures are positioned in variable spacings and groups on this surface and are of variable size. This particular development view shows a flame deflector suitable for twin rocket engine exhaust streams. The oval shaped areas 80 and 81 are the impingement zones where the water rates are at a maximum. For the most part, the front, sides and back (upstream of the region of impingement) do not require cooling. It has been found that the aperture groups within and below the region of impingement take the form of various delta-shaped areas as shown. Water rates in the region of impingement in a typical deflector range from 10 to 30 lb.-per-sec.-per-sq.-ft., the minimum satisfactory rate for an entire deflector being typically approximately 0.7 lbs.-per-sec.-per-sq.-ft. It is to be noticed that the water ejection at various areas varies with the angle of impingement. Thus, the fact that the impingement zone 80 is about one-half imposed on the curved edge of the deflector necessitates more water flow on the curve and side upstream of the zone of impingement as in areas 82.

The factors which must be taken into consideration to give the necessary hole pattern include the hole area location and size of holes, the water rate, the flow pattern, the water rate per unit surface area, the manifold pressure, the average coefficient of discharge, and the static pressure and temperature of the inner surface due to the rocket engine exhaust blast. Typical pressures within the various manifolds of a typical deflector vary from 12 p.s.i.g. to 85 p.s.i.g. Hole spacings of from 2 to 5 inches with hole sizes of from 1/8 inch to 3/4 inch in diameter are typical values which give good coverage without seriously weakening the deflector shell structurally.

In addition to the advantages heretofore stated in the present invention the film coolant system has also been found effective in protecting the deflector from the severe thermal shock that can occur when liquid oxygen or other low temperature propellant is drained through it. The deflector has two very desirable secondary uses in that it provides an excellent system for safely disposing of any unused or unwanted propellants and for reducing the over-all noise level of the rocket blast. The manifolds serve not only to convey the water into the points of impingement of the rocket exhaust stream but serve also as stiffening members for the deflector shell. The exhaust gas stream or flame formed from the rocket engine sweeps the injected water along the surface of the deflector to form an insulating film thereon. The flame, in turning, produces a downward force on the deflector which can be adjusted to equal or exceed the upward thrust of the engine by adjusting the angle of deflection to exceed 90°. As seen in the above described modifications of the present device this downward force is reacted against the upward thrust of the engine through rigid connections, reducing to a minimum the size and number of structural members required to withstand major loads. The savings in construction and manufacture costs and the ease and efficiency of rocket engine testing and rocket launching are important results of the use of the present invention.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A rocket engine testing device comprising a flame deflector adapted to be positioned to receive the rocket exhaust of a rocket engine on the inner surface thereof, water manifolds extending at least partially around the outer periphery of said deflector at various positions along the length of said deflector, means forming apertures leading from said manifolds to said inner surface at the zone of impingement of said exhaust and means to supply water to said manifolds and through said apertures at pressures and amounts based on a predetermined impingement pressure and temperature of said rocket exhaust.

2. In combination with a rocket engine mounted on a test stand, a curved metal deflector adapted to be positioned to deflect the rocket engine exhaust stream, means on the inner surface of said deflector to inject water at points of impingement of said exhaust stream to provide film cooling of said surface, and tension members connected between said deflector and said engine to react thrust loads on said deflector directly back to the engine whereby the downward force on said deflector is reacted against the upward thrust of said rocket engine cancelling out vertical stress components.

3. A rocket engine testing device comprising an open-ended tubular flame deflector adapted to be positioned under a rocket engine exhaust portion to deflect exhaust gases therefrom, a series of variably spaced water manifolds on the exterior periphery of said deflector, means forming variably spaced apertures of varying size leading from said manifolds to the inner surface of said deflector at zones of impingement by said exhaust gases and means supplying water at various pressures to said manifolds and said apertures.

4. A mobile rocket engine assembly testing and launching device comprising a curved metal flame deflector adapted to be positioned under a rocket engine exhaust portion to turn exhaust gases being emitted therefrom, a direct rigid connection between said deflector and said engine assembly, to provide an approximate straight-line stress path therebetween, base means associated with said deflector to freely support said deflector on the ground, said deflector having a flame turning angle of substantially at least 90°, and means, including water injection means on the inside surface of said deflector, to provide film cooling of said inside surface of said deflector.

References Cited in the file of this patent

UNITED STATES PATENTS

| 1,925,139 | Fellers | Sept. 5, 1933 |
| 2,498,995 | Manning | Feb. 28, 1950 |
| 2,523,656 | Goddard | Sept. 26, 1950 |
| 2,526,219 | Goddard | Oct. 17, 1950 |
| 2,608,363 | Shumaker | Aug. 26, 1952 |
| 2,683,002 | Adams et al. | July 6, 1954 |
| 2,692,024 | Burdett et al. | Oct. 19, 1954 |

FOREIGN PATENTS

| 914,341 | France | June 17, 1946 |